(12) United States Patent
Nojima

(10) Patent No.: US 7,564,616 B2
(45) Date of Patent: Jul. 21, 2009

(54) ELECTRO-OPTICAL ELEMENT AND SCANNING OPTICAL APPARATUS

(75) Inventor: Shigeo Nojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 11/850,355

(22) Filed: Sep. 5, 2007

(65) Prior Publication Data

US 2008/0062507 A1 Mar. 13, 2008

(30) Foreign Application Priority Data

Sep. 12, 2006 (JP) ............................. 2006-246780

(51) Int. Cl.
*G02F 1/29* (2006.01)
*G02F 1/00* (2006.01)

(52) U.S. Cl. ...................... 359/315; 359/321; 359/322

(58) Field of Classification Search ................. 359/298, 359/315, 321, 322
See application file for complete search history.

(56) References Cited

U.S. PATENT DOCUMENTS

| 5,212,583 | A | * | 5/1993 | Vali et al. ................... 359/245 |
| 5,815,222 | A | | 9/1998 | Matsuda et al. |
| 6,154,260 | A | | 11/2000 | Matsuda et al. |
| 6,339,445 | B1 | | 1/2002 | Matsuda et al. |
| 7,471,446 | B2 | * | 12/2008 | Uchikawa et al. ............ 359/315 |
| 2002/0060659 | A1 | | 5/2002 | Matsuda et al. |
| 2003/0030880 | A1 | | 2/2003 | Ramanujan et al. |
| 2008/0043319 | A1 | * | 2/2008 | Uchikawa et al. ............ 359/315 |
| 2008/0130094 | A1 | * | 6/2008 | Tang ........................... 359/315 |
| 2008/0158634 | A1 | * | 7/2008 | Otoguro ...................... 359/224 |
| 2008/0159785 | A1 | * | 7/2008 | Nagase ........................ 399/218 |

FOREIGN PATENT DOCUMENTS

| CN | 1077504 A | 10/1993 |
| JP | A-01-187535 | 7/1989 |
| JP | A-04-053931 | 2/1992 |
| JP | A-07-318992 | 8/1995 |
| JP | A-07-261203 | 10/1995 |
| JP | A-08-184860 | 7/1996 |
| JP | A-2001-296566 | 10/2001 |
| JP | A-2003-075767 | 3/2003 |
| JP | A-2003-322884 | 11/2003 |
| JP | A-2004-004194 | 1/2004 |

* cited by examiner

*Primary Examiner*—David N Spector
(74) *Attorney, Agent, or Firm*—Oliff & Berridge PLC

(57) ABSTRACT

An electro-optical element includes an optical element that scans a laser beam made incident thereon when a refractive index distribution changes according to a size of an electric field generated in the inside of the electro-optical element and a first electrode and a second electrode arranged on two surfaces of the optical element opposed, to each other. At least one of the first electrode and the second electrode is a transparent electrode.

12 Claims, 5 Drawing Sheets

ELECTRO-OPTICAL ELEMENT AND SCANNING OPTICAL APPARATUS

BACKGROUND

1. Technical Field

The present invention relates to an electro-optical element and a scanning optical apparatus.

2. Related Art

In projection image display apparatuses in recent years, an electric-discharge lamp such as a super-high pressure mercury lamp is generally used as a light source. However, such an electric-discharge lamp has problems in that, for example, a durable life is relatively short, instantaneous lighting is difficult, a color reproducibility range is narrow, an ultraviolet ray irradiated from the lamp may deteriorate a liquid crystal light bulb. Thus, there is proposed a projection image display apparatus in which a laser beam source that irradiates monochromatic light is used instead of such an electric-discharge lamp (see, for example, JP-A2003-75767).

As the projection image display apparatus in which such a laser beam source is used, there is an image display apparatus of a laser scan type in which scanning means (a scanner) is used. The scanning means used in the image display apparatus of the laser scan type is required to realize both high-speed scanning and a large deflection angle. In particular, it is necessary to scan a laser beam at a scanning speed of several tens kHz to display video signals having formats such as VGA (Video Graphics Array), XGA (Extended Graphics Array), and HDTV (High Definition Television). Thus, in general, an image display apparatus in which a resonant MEMS (Micro Electro Mechanical System) scanner is used as scanning means is adopted because a deflection angle of 15° to 30° can be expected.

The MEMS scanner still has problems described below. As a first problem, since the MEMS scanner is a resonant scanner, the MEMS scanner can perform only a sinusoidal reciprocating action at a non-uniform rate. As a second problem, since the MEMS scanner has a high Q value, it is impossible to obtain a practical deflection angle when a frequency deviates from a resonance frequency. Therefore, it is necessary to accurately control a resonance frequency of a system including the MEMS scanner or change a driving frequency following a change in the resonance frequency of the system. The accurate control of a resonance frequency is extremely difficult technically. The change of a driving frequency needs to be precisely synchronized with a second axis of the MEMS scanner.

As a third problem, since the MEMS scanner has a limit in a scanning speed, display at a resolution such as 4 k (4096× 2160) of the DCI (Digital Cinema Initiatives) specifications is difficult. As an example of scanning means other than the MEMS scan, there are an acoustic optical scanner and an electro-optical scanner. These scanners have a small scanning deflection angle compared with that of the MEMS scanner and cannot obtain a practical scanning deflection angle.

Thus, in order to obtain a large deflection angle using the electro-optical scanner, as shown in FIG. 8A, it is conceivable to set a dimension N between electrodes of an element 101 long. However, when the dimension N between the electrodes is set long, it is necessary to apply a larger voltage to the electrodes in order to generate an electric field same as that generated when the dimension N between the electrodes of the element 101 is snort. As a result, power consumption is increased to cause an increase in cost. Thus, as shown in FIG. 8B, it is conceivable to set a dimension between electrodes short in order to perform low-voltage drive while setting a dimension M of an element 102 in a traveling direction of light long in order to obtain a large deflection angle. However, with such a structure, light that has traveled the inside of the element 102 and has been bent downward by a refractive index distribution collides with a lower electrode 105 when the dimension M of the element 102 is too long. Therefore, the light that has traveled the inside of the element 102 is not emitted from an emitting end face of the element 102.

SUMMARY

An advantage of some aspects of the invention is to provide an electro-optical element and a scanning optical apparatus that are capable of obtaining a large deflection angle and realizing power saving.

An electro-optical element according to an aspect of the invention includes an optical element that scans a laser beam made incident thereon when a refractive index distribution changes according to electric field intensity generated in the inside of the electro-optical element and a first electrode and a second electrode arranged on two surfaces of the optical element opposed to each other. At least one of the first electrode and the second electrode is a transparent electrode.

In the electro-optical element, an electric field is generated in the optical element by the application of a voltage to the first electrode and the second electrode. The refractive index distribution of the optical element is continuously increased or decreased in one direction by this electric field. Therefore, the laser beam traveling in a direction perpendicular to the electric field generated in the inside of the optical element is bent from a low refractive index side to a high refractive index side. In this case, since at least one of the first electrode and the second electrode is a transparent electrode, the laser beam not emitted from a light-emitting end face of the optical element and bent to the first electrode or the second electrode is made incident on the transparent electrode. It is necessary to generate an electric field in the optical element to bend the laser beam to the transparent electrode side. The laser beam is refracted on an interface between the optical element and the transparent electrode and emitted from an end face on an emission side of the transparent electrode. Therefore, even if a dimension In a direction perpendicular to a direction of the electric filed of the optical element is set long as in the past and a distance between the first electrode and the second electrode is set short in order to obtain a larger deflection angle, it is possible to emit the incident laser beam. Consequently, since it is unnecessary to set a dimension in the direction of the electric field of the optical element long to prevent the laser beam from colliding with the electrodes, it is possible to set a voltage applied to the first electrode and the second electrode low. Thus, it is possible to efficiently generate an electric field in the optical element while realizing power saving.

It is preferable that a light-emitting end face of the transparent electrode is tilted with respect to a light-emitting end face of the optical element.

In the electro-optical element, the light that has traveled the inside of the optical element and has been made incident on the transparent electrode travels the inside of the transparent electrode and is emitted from the light-emitting end face of the transparent electrode. In this case, an emission angle of the light on the light-emitting end face of the transparent electrode is larger when the light-emitting end face of the transparent electrode is tilted with respect to the light-emitting end face of the optical element than when the light-emitting end face of the transparent electrode is not tilted with respect to the light-emitting end face of the optical element, i.e., when the light-emitting end face of the transparent electrode is perpendicular to one surface and the other surface of the optical element. In other words, it is possible to further increase a deflection angle (a scanning angle) of the light emitted from the light-emitting end face of the transparent electrode by tilting the light-emitting end face as in the aspect of the invention.

It is preferable that an optical member having light transmission properties is arranged on the transparent electrode.

In the electro-optical element, the light that has traveled the inside of the optical element and has been made incident on the transparent electrode travels the inside of the transparent electrode. The light that has not been emitted from the light-emitting end face of the transparent electrode and has traveled to the optical member provided on the transparent electrode is refracted on an interface between the transparent electrode and the optical member and emitted from an end face on an emission side of the optical member. In other words, compared with a state without the optical member (the state of the air), a critical angle of the light made incident on the interface between the transparent electrode and the optical member is large. Thus, it is possible to control total reflection of the light on this interface. Therefore, by providing the optical member, since the light not emitted from the light-emitting end face of the transparent electrode is emitted from the end face on the emission side of the optical member, it is possible to surely emit the light from the electro-optical element. Further, by providing the optical member, since it is possible to set a dimension in the electric field direction of the entire electro-optical element long without setting a dimension in the electric field generation direction of the optical element long, it is possible to obtain a larger deflection angle. By setting the dimension in the electric field direction of the entire electro-optical element long using the optical member, it is possible to hold down cost compared with cost required when the thickness of the optical element is set large.

It is preferable that a refractive index of the optical member is higher than a refractive index of the transparent electrode.

In the electro-optical element, since the refractive index of the optical member is higher than the refractive index of the transparent electrode, it is possible to surely prevent the light that has traveled to the optical member, which is provided on the surface of the transparent electrode on the opposite side of the surface opposed to the optical element, from being totally reflected on the interface between the transparent electrode and the optical member. Therefore, the light that has traveled to the optical member surely travels the inside of the optical member and is emitted from the end face on the emission side of the optical member. Consequently, since it is possible to prevent stray light from being generated in the inside of the optical element, it is possible to provide an electro-optical element that is capable of satisfactorily performing scanning of a laser beam.

It is preferable that the light-emitting end face of the optical member is tilted with respect to the light-emitting end face of the optical element.

In the electro-optical element, it is possible to obtain effects same as those obtained when the light-emitting end face of the transparent electrode is tilted. Moreover, it is easier to chamfer the light-emitting end face when the light-emitting end face of the optical member is tilted than when the transparent electrode is tilted. As a result, it is possible to accurately tilt the light-emitting end face of the optical member to a desired tilt angle in a short time.

It is preferable that a light-shielding member is provided on the light-emitting end face side of the optical element.

In the electro-optical element, by providing the light-shielding member on a surface of the optical element on the opposite side of the surface on which the laser beam is made incident, it is possible to prevent Fresnel reflected light caused by a difference between refractive indexes of the optical element and the transparent electrode from being emitted from the light-emitting end face of the optical element. Moreover, even if light causes total reflection on the interface between the optical element and the transparent electrode or the interface between the transparent electrode and the optical member, the light is prevented from being emitted from the light-emitting end face of the optical element by the light-shielding member.

When the electro-optical element has broken down because of some cause, since a voltage is not applied to the electro-optical element, i.e., an electric field is not generated in the electro-optical element, the scanning of the laser beam is stopped. In this case, since the light-shielding member is provided on the surface of the optical element on the opposite side of the surface on which the laser beam is made incident, light emitted from the electro-optical element is shielded by the light-shielding member. Therefore, it is possible to prevent the laser beam from continuously lighting a certain portion (one point) on the outside of the device.

As the failure of the electro-optical element, a failure in that a voltage is continuously applied thereto and a failure in that a voltage is not applied thereto could occur. Since the latter failure is more likely to occur, this failure is assumed.

It is preferable that the optical element has a composition of $KT_{a1-x}Nb_xO_3$.

In the electro-optical element, the optical element is a crystal (hereinafter referred to as KTN crystal) having a composition of $KT_{a1-x}Nb_xO_3$ (tantalic niobic potassium), which is a dielectric material having a high dielectric constant. It is known that the KTN crystal has a characteristic that a crystal system is changed from a cubic system to a tetragonal system and from the tetragonal system to a rhombohedral system according to temperature and, in the cubic system, the KTN crystal has a large secondary electro-optical effect. In particular, in a region close to a phase transition temperature from the cubic system to the tetragonal system, a phenomenon in which a dielectric constant diverges occurs and the secondary electro-optical effect proportional to a square of the dielectric constant takes an extremely large value. Therefore, the crystal having the composition of $KT_{a1-x}Nb_xO_3$ is capable of controlling an applied voltage necessary in changing a refractive index to be low compared with those of the other crystals. This makes it possible to provide an electro-optical element that is capable of realizing power saving.

A scanning optical apparatus according to another aspect of the invention includes a light source device that emits light and scanning means for scanning the light emitted from the light source device to a projection surface. The scanning means has the electro-optical element described above.

In the scanning optical apparatus, the light emitted from the light source device is scanned to the projection surface by the scanning means. In this case, by using the electro-optical element having a large deflection angle as described above, a scanning optical apparatus in which scanning means capable of coping with a high resolution is used is obtained. Therefore, it is possible to obtain a scanning optical apparatus that can more clearly display an image on the projection surface without causing deterioration in an image quality.

It is preferable that the electro-optical element performs horizontal scanning.

In the scanning optical apparatus, the electro-optical element performs the horizontal scanning. Thus, it is possible to realize an inexpensive and high-performance scanning optical apparatus by using, for example, an inexpensive polygon mirror for vertical scanning.

The "horizontal scanning" is scanning on a high-speed side in the scanning in the two directions. The "vertical scanning" is scanning on a low-speed side.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
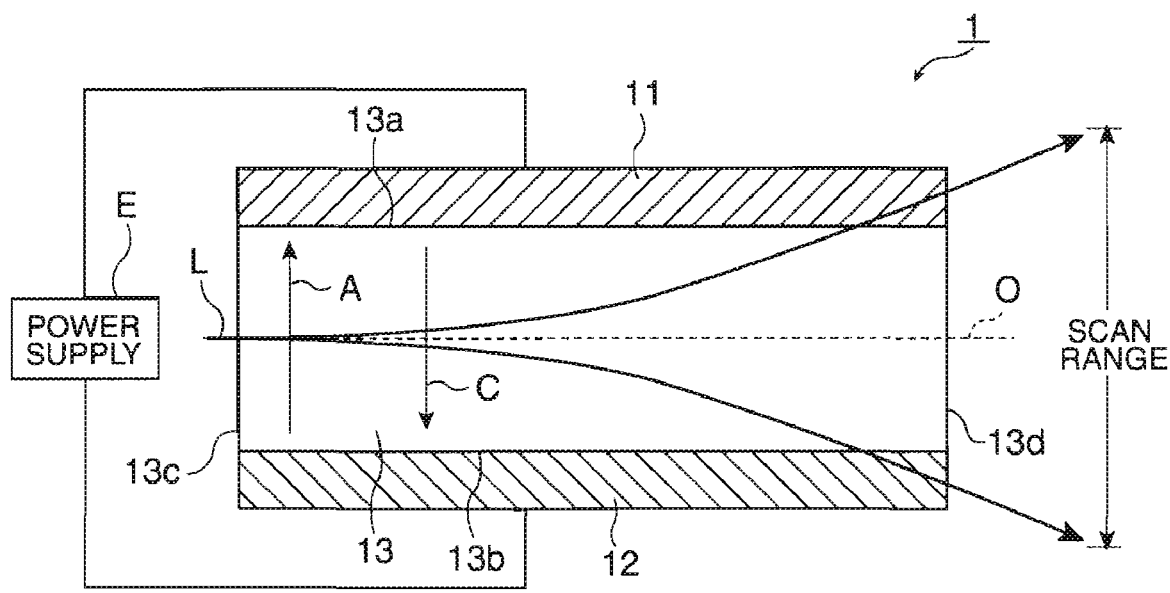
FIG. 1 is a main part sectional view showing an electro-optical element according to a first embodiment of the invention.

Exemplary embodiments of the invention will be hereinafter explained with reference to the accompanying drawings. In the drawings, scales of members are changed as appropriate to show the members in recognizable sizes.

First Embodiment

An electro-optical element 1 scans a laser beam traveling the inside thereof when a refractive index distribution changes according to electric field intensity generated in the inside. Specifically, as shown in FIG. 1, the electro-optical element 1 includes a first electrode 11, a second electrode 12, and an optical element 13. The first and second electrodes 11 and 12 are transparent electrodes formed of a transparent conductor such as ITO (indium tin oxide with a refractive index of 2.0) or IZO (indium zinc oxide)

The optical element 13 is a dielectric crystal having an electro-optical effect (an electro-optic crystal. In this embodiment, the optical element 13 is formed of a crystal material having a composition of KTN (tantalic niobic potassium $(KT_{a1-x}Nb_xO_3)$ with a refractive index of 2.4) In the optical element 13, the first electrode 11 is arranged on an upper surface (one surface) 13a thereof and the second electrode 12 is arranged on a lower surface (the other surface) 13b thereof. A power supply E that applies a voltage is connected to the first and second electrodes 11 and 12. In the first and second electrodes 11 and 12, as shown in FIG. 1, dimensions in a traveling direction of a laser beam L traveling in the optical element 13 are substantially the same. Consequently, an electric field is generated in the optical element 13 between the first and second electrodes 11 and 12. For example, when a voltage of −250V is applied to the first electrode 11 and a voltage of 0V is applied to the second electrode 12, an electric field is generated from the second electrode 12 to the first electrode 11 (in a direction indicated by an arrow A). When a voltage of +250V is applied to the first electrode 11 and a voltage of 0V is applied to the second electrode 12, an electric field is generated from the first electrode 11 to the second electrode 12 (in a direction indicated by an arrow C).

Scanning of a laser beam emitted from the electro-optical element will be explained.

Figure 2:
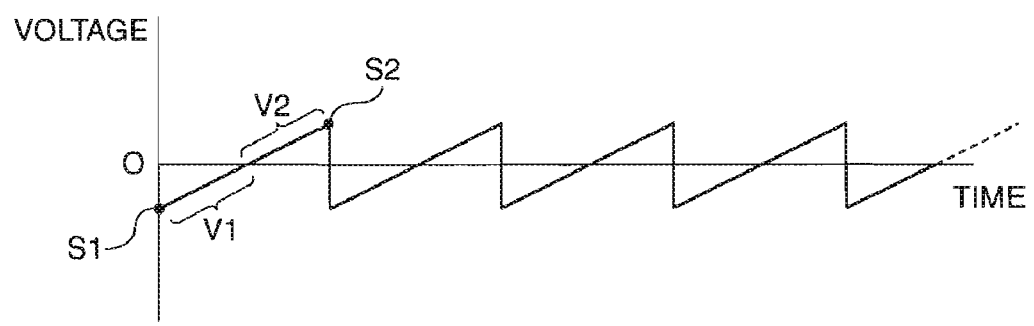
FIG. 2 is a graph showing a waveform of a voltage applied to electrodes of the electro-optical element in FIG. 1.

A waveform of a voltage applied to the first electrode 11 by the power supply E is, for example, a waveform of a sawtooth shape as shown in FIG. 2. A voltage of a voltage pattern V1 gradually falling from an initial voltage value S1 (e.g., −250V) to 0V and a voltage of a voltage pattern V2 gradually rising from 0V to a maximum voltage value S2 (e.g., +250V) are continuously applied to the first electrode 11. When the voltage applied to the first electrode 11 reaches the maximum voltage value S2, a voltage of the initial voltage value S1 is applied. An optical path of a laser beam emitted from the optical element 13 when a voltage applied to the first electrode 11 is 0V is O. By changing the voltage applied to the first electrode 11, light made incident on an incidence end face 13c of the optical element 13 and emitted from a light-emitting end face 13d is scanned in a one-dimensional direction in a scan range (a scanning range) in the vertical direction with the optical path O as a reference. A voltage applied to the second electrode 12 is fixed to 0 v.

Figure 3:
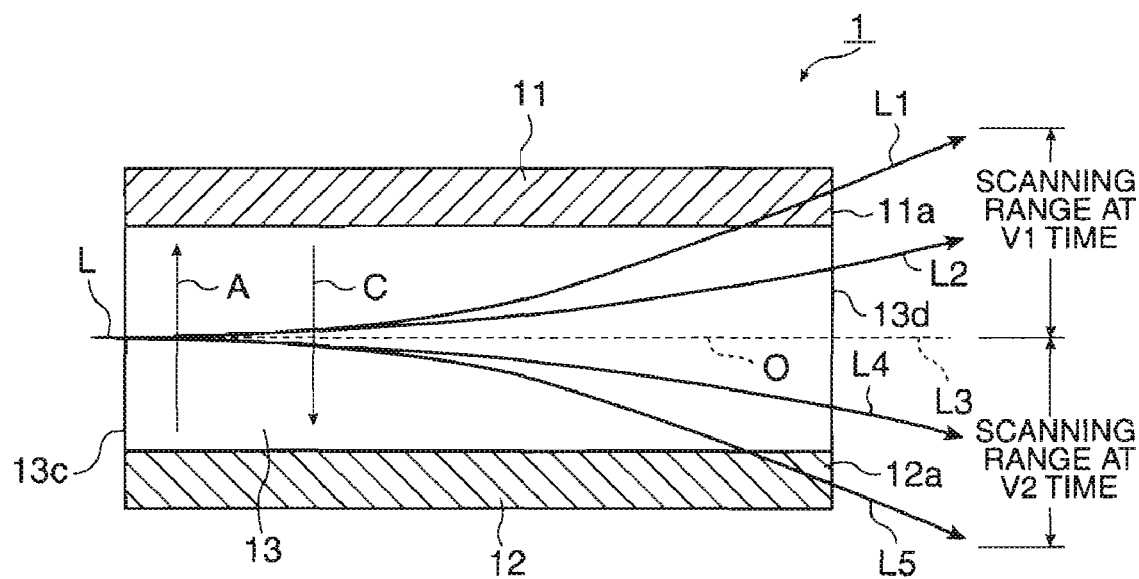
FIG. 3 is a main part sectional view showing scanning of light at the time when the voltage waveform in FIG. 2 is inputted.

When a voltage of the initial voltage value −250V is applied to the first electrode 11, as shown in FIG. 3, a direction of an electric field generated in the optical element 13 is a direction indicated by an arrow A. The laser beam L traveling the inside of the optical element 13 is bent to the first electrode 11 side. This laser beam is refracted on an interface between the optical element 13 and the first electrode 11 and made incident on the first electrode 11. A laser beam L1 that has traveled the inside of the first electrode 11 is emitted from a light-emitting end face 11a of the first electrode 11. The voltage applied to the first electrode 11 is gradually lowered as indicated by the voltage pattern V1 in FIG. 2. Consequently, a laser beam L2 traveling the inside of the optical element 13 is irradiated to the center of the scan range and gradually emitted from the light-emitting end face 13d of the optical element 13 at a smaller deflection angle. Thereafter, when the voltage applied to the first electrode 11 reaches 0V, a laser beam L3 emitted from the light-emitting end face 13d of the optical element 13 travels on the optical path O and is irradiated on the center of the scan range.

Subsequently, the voltage applied to the first electrode 11 is gradually raised as indicated by the voltage pattern V2 in FIG. 2. Consequently, the direction of the electric field generated in the optical element 13 is changed to a direction indicated by an arrow C. The laser beam L traveling the inside of the optical element 13 is bent to the second electrode 12 side. A laser beam L4 traveling the inside of the optical element 13 is gradually emitted from the light-emitting end face 13d of the optical element 13 at a larger deflection angle.

Thereafter, when a voltage of the maximum voltage value +250V is applied to the first electrode 11, a laser beam L5 traveling the inside of the optical element 13 is refracted on an interface between the optical element 13 and the second electrode 12 and made incident on the second electrode 12. The laser beam L5 that has traveled the inside of the second electrode 12 is emitted from a light-emitting end face 12a of the second electrode 12.

In the electro-optical element 1 according to this embodiment, even if a dimension in a direction perpendicular to the directions A and C of the electric fields of the optical element 13 is set long in order to obtain a large deflection angle and a distance between the first and second electrodes 11 and 12 is set short in order to perform low-voltage drive, the emission of a laser beam is not hindered by the first and second electrodes 11 and 12 because the first and second electrodes 11 and 12 are transparent electrodes. This makes it unnecessary to set a dimension in the electric field directions A and C of the optical element 13 long to prevent the laser beam from being irradiated on the first and second electrodes 11 and 12. Therefore, it is possible to efficiently generate an electric field in the optical element 13 while realizing power saving of voltages applied to the first and second electrodes 11 and 12.

In other words, in the electro-optical element 1 according to this embodiment, it is possible to obtain a large deflection angle and realize power saving.

The refractive indices of the optical element 13 and the transparent electrodes are examples. In this embodiment, the refractive index of the optical element 13 is set higher than the refractive index of the transparent electrodes. However, it is preferable that the refractive index of the first and second electrodes 11 and 12 is larger than the refractive index of the optical element 13. This makes it possible to prevent a laser beam from being totally reflected on the interface between the optical element 13 and the first electrode 11 and the interface between the optical element 13 and the second electrode 12. Therefore, it is possible to prevent stray light from being generated in the inside of the optical element 13.

In this embodiment, the laser beam made incident on the optical element 13 is scanned to both the first electrode 11 side and the second electrode 12 side. However, the laser beam may be scanned to one side. On the case of this scanning, only the electrode on a side on which the refractive index is increased by the application of a voltage may be formed by a transparent electrode. In the case of the scanning to one side, it is possible to further increase a deflection angle of the laser beam by making the laser beam incident from the first electrode 11 side of the incidence end face 13c of the optical element 13 and applying a voltage of only the voltage pattern V1 or the voltage pattern V2 to the first electrode 11.

Second Embodiment

A second embodiment of the invention will be explained with reference to FIG. 4. In embodiments described below, components same as those of the electro-optical element 1 according to the first embodiment are denoted by the identical reference numerals and signs and explanations of t components are omitted.

An electro-optical element 20 according to this embodiment is different from the electro-optical element 1 in that the electro-optical element 20 includes first and second glass plates 21 and 22 made of an optical glass material. This embodiment is effective when laser beams are not emitted from the light-emitting end faces 11a and 12a of the first and second electrodes 11 and 12 in the first embodiment.

Figure 4:
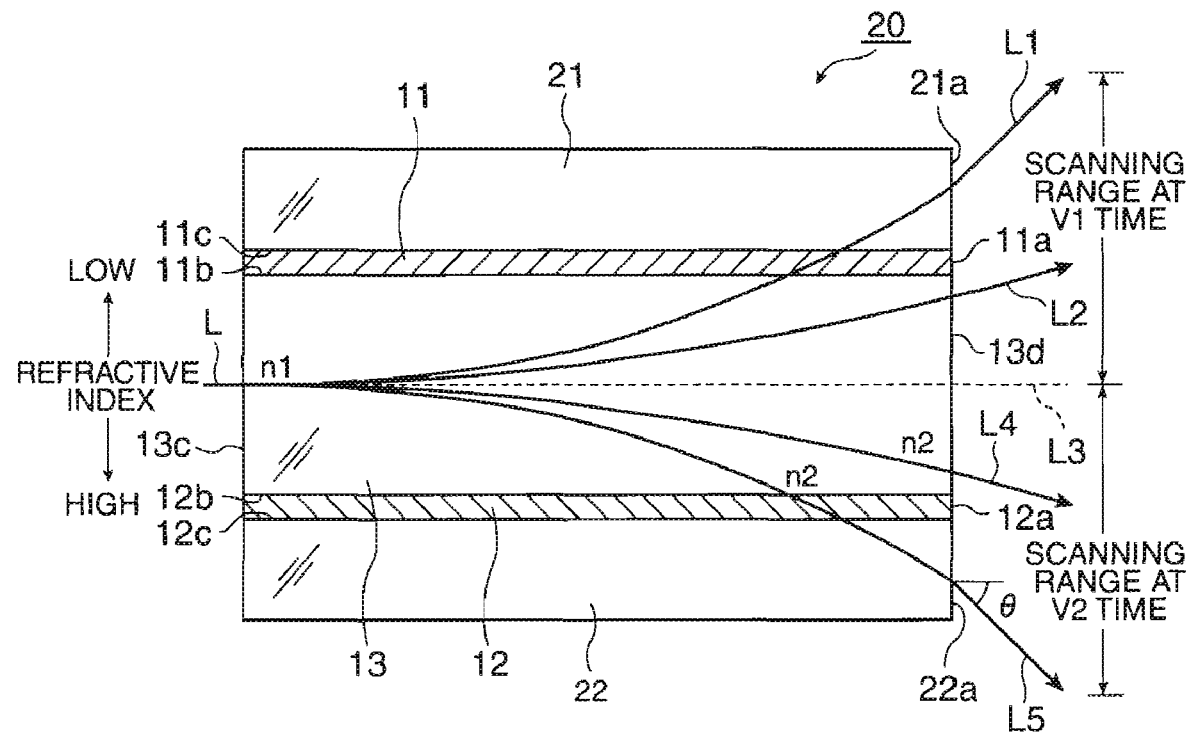
FIG. 4 is a main part sectional view showing an electro-optical element according to a second embodiment of the invention.

As shown in FIG. 4, the first glass plate (optical member) 21 is provided in contact with a surface 11c of the first electrode 11 on the opposite side of a surface 11b opposed to the optical element 13. The second glass plate (optical member) 22 is provided in contact with a surface 12c of the second electrode 12 on the opposite side of a surface 12b opposed to the optical element 13. These first and second glass plates 21 and 22 are substrates having light transmission properties.

Consequently, as in the first embodiment, the laser beam L1 made incident on the first electrode 11 is refracted on an interface between the first electrode 11 and the first glass plate 21 and made incident on the first glass plate 21. The laser beam that has traveled the inside of the first glass plate 21 is emitted from a light-emitting end face 21a of the first glass plate 21.

Similarly, the laser beam L5 made incident to the first electrode 11 is refracted on an interface between the second electrode 12 and the second glass plate 22 and made incident on the second glass plate 22. The laser beam that has traveled the inside of the second glass plate 22 is emitted from a light-emitting end face 22a of the second glass plate 22.

In this case, an emission angle (a deflection angle) θ of a laser beam emitted from the electro-optical element 20 is represented by the following equation when, as shown in FIG. 4, a refractive index in an incidence section at the time when the laser beam L is made incident on the optical element 13 is n1, a refractive index in an emission section at the time when the laser beam L is emitted from the optical element 13 is n2 (in fact, a refractive index of an emission section of the optical element 13 at the time when the laser beam L4 is emitted from the light-emitting end face 13d of the optical element 13 is n2, and a refractive index of an optical element of the interface between the optical element 13 and the second electrode 12 at the time when the laser beam L5 is emitted from the light-emitting end face 22a of the second glass plate 22 after passing through the second electrode 12 is n2).

$$\theta = \arcsin(\sqrt{n_2^2 - n_1^2}) \approx \sqrt{n_2^2 - n_1^2} = \sqrt{2n_1 \Delta n + \Delta n^2} \approx \sqrt{2n_1 \Delta n} \, (\Delta n = n_2 - n_1)$$

Equation 1

When n1 is regarded as a fixed value "n" because fluctuation of n1 is small, Equation 1 can be regarded as a function of Δn. Moreover, if an electro-optical effect is a Kerr effect, since a change in the fixed value "n" is an effect proportional to a square of field intensity, it is seen from Equation 1 that the emission angle (the deflection angle) θ is an effect proportional to the field intensity. If n=2.4 and Δn=0.01, θ≅12.7 degrees. Since the field intensity is inversely proportional to the thickness of an electrode, as the dimension in the electric field directions A and C of the optical element 13 is smaller, the emission angle (the deflection angle) with respect to an applied voltage increases. Therefore, it is possible to drive the optical element 13 at a lower voltage and obtain a larger deflection angle by reducing the thickness of the optical element 13.

In the electro-optical element 20 according to this embodiment, it is possible to obtain effects same as the effects of the electro-optical element 1 according to the first embodiment. Moreover, in the electro-optical element 20 according to this embodiment, when laser beams are not emitted from the light-emitting end faces 11a and 12a of the first and second electrodes 11 and 12, a laser beam traveling the inside of the optical element 13 is emitted from the light-emitting end face 13d side of the optical element 13 by the first and second glass plates 21 and 22. In other words, the laser beam is emitted from the light-emitting end face 21a of the first glass plate 21 and the light-emitting end face 22a of the second glass plate 22.

Therefore, it is possible to provide the electro-optical element 20 that is capable of more surely emitting a laser beam from the light-emitting end face 13d side of the optical element 13 and scanning the laser beam at a large deflection angle.

In the first embodiment, it is difficult to form the transparent electrodes thick. However, in the second embodiment, since the first and second glass plates 21 and 22 only have to be used, it is possible to emit, with a simple structure, a laser beam from the light-emitting end face 18d side of the optical element 18.

In this embodiment, the laser beam made incident on the optical element 13 is scanned to both the first electrode 11 side and the second electrode 12 side. However, the laser beam may be scanned to one side. In the case of this scanning, only the electrode on a side on which the refractive index is increased by the application of a voltage may be formed by a transparent electrode and the glass plates may be arranged on the side of the transparent electrode.

It is preferable that a refractive index of the first and second glass plates 21 and 22 is higher than a refractive index of the first and second electrodes 11 and 12. Then, it is possible to prevent a laser beam from being totally reflected on the interfaces between the first electrode 11 and the optical element 13 and the interface between the second electrode 12 and the optical element 13. Consequently, since it is possible to prevent stray light from being generated in the inside of the optical element 13, it is possible to satisfactorily perform scanning of the laser beam.

The glass plates made of optical glass are used as the optical members. However, the optical members are not limited to this. The optical members may be any members as long as the members have light transmission properties. For example, the optical members may be formed of a KTN crystal same as that of the optical element 13.

Modification of the Second Embodiment

Figure 5:
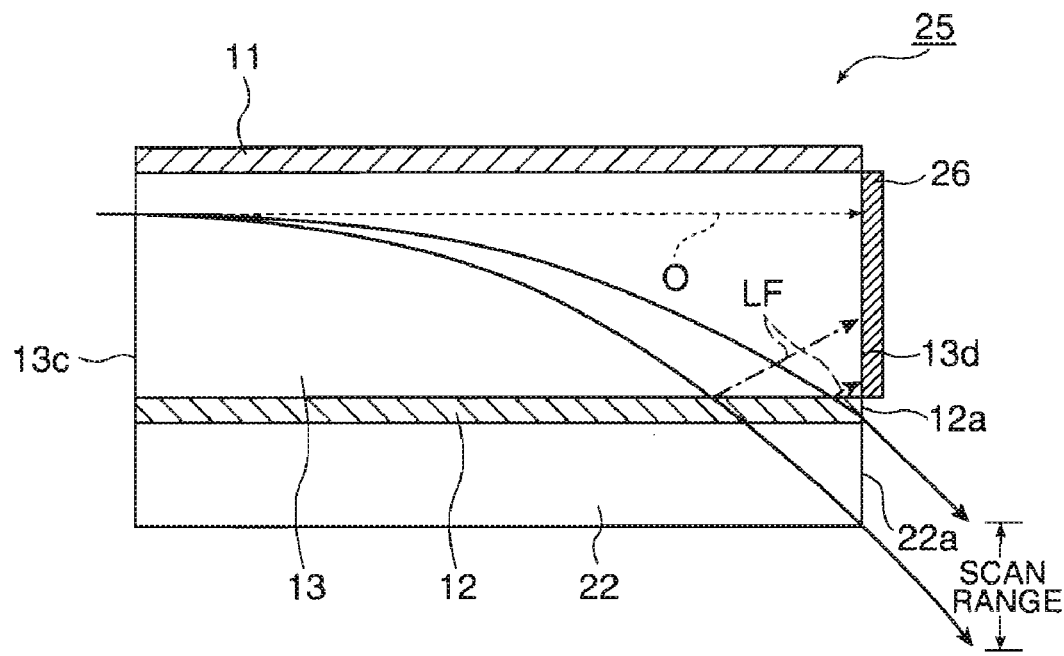
FIG. 5 is a main part sectional view showing an electro-optical element according to a modification of the second embodiment of the invention.

In an electro-optical element 25, as shown in FIG. 5, when a laser beam made incident on the optical element 13 is scanned to one of the first electrode 11 side and the second electrode 12 side, a light-shielding plate (a light-shielding member) 26 may be provided on the light-emitting end face 13d side of the optical element 13. In this structures the second glass plate 22 is provided only on the second electrode 12 side.

The light-shielding plate 26 is provided in contact with the light-emitting end face 13d of the optical element 13. When Fresnel reflection occurs on the interface between the optical element 13 and the second electrode 12 because of a difference of refractive indexes thereof, it is possible to prevent, with this light-shielding plate 26, Fresnel reflected light LF from being emitting from the light-emitting end face 13d of the optical element 13.

When the light-shielding plate 26 is provided on the light-emitting end face 13d of the optical element 13 as in this modification, the laser beam made incident on the optical element 13 is emitted from, the light-emitting end face 12a of the second electrode 12 or the light-emitting end face 22a of the second glass plate 22.

When the electro-optical element 25 has broken down because of some cause, since a voltage is not applied to the electro-optical element 25, i.e., an electric field is not generated in the electro-optical element 25, the scanning of the laser beam is stopped. In this case, the light-shielding plate 26 is provided on the light-emitting end face 13d of the optical element 13, i.e., the optical path O on which a laser beam at the time when an electric field is not generated in the optical element 13 is emitted from the optical element 13. Thus, light emitted from the electro-optical element 25 is shielded by the light-shielding plate 26. Therefore, it is possible to prevent the laser beam from continuously lighting a certain portion (one point) on the outside of the device.

In this modification, the light-shielding plate 26 is provided in contact with the light-emitting end face 13d of the optical element 13. However, the optical element 13 may be arranged to be spaced apart from the light-emitting end face 13d side.

Third Embodiment

A third embodiment according to the invention will be explained with reference to FIG. 6.

An electro-optical element 30 according to this embodiment is different from the electro-optical element 20 according to the second embodiment in that the light-emitting end faces 21a and 22a of the first and second glass plates 21 and 22 are tilted.

Figure 6:
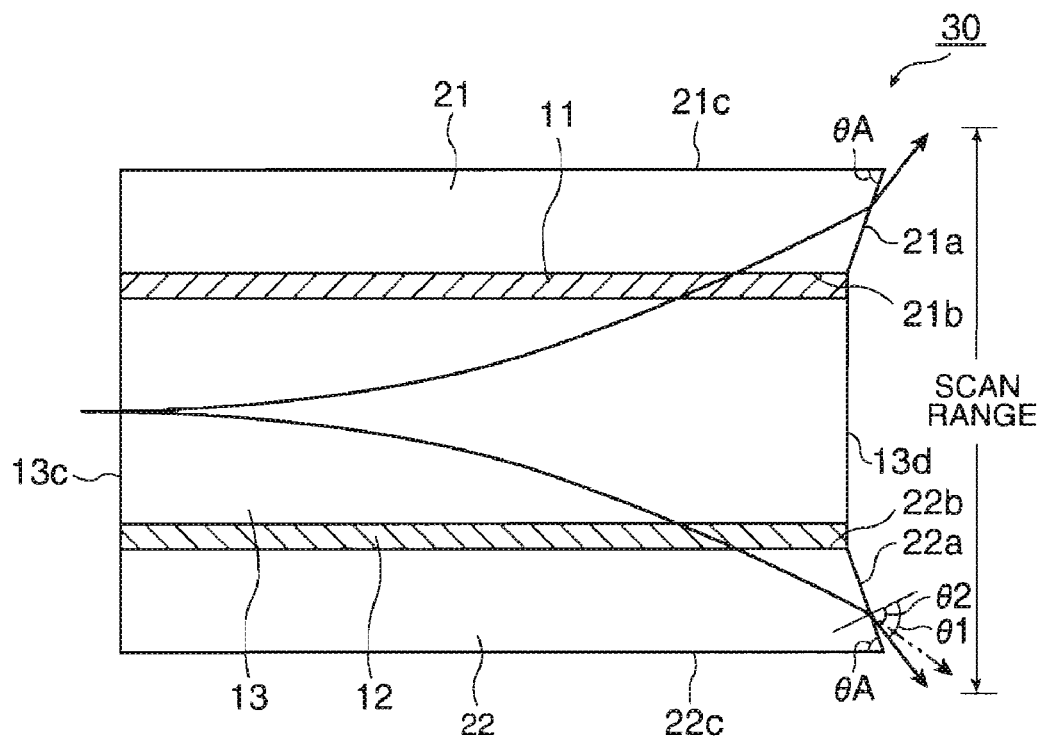
FIG. 6 is a main part sectional view showing an electro-optical element according to a third embodiment of the invention.

As shown in FIG. 6, the light-emitting end face 21a of the first glass plate 21 is tilted at an angle of θA from the surface 21c of the first glass plate 21 on the opposite side of the surface 21b opposed to the first electrode 11, i.e., tilted with respect to the light-emitting end face 13d of the optical element 13. The tilt angle θA is a non-right angle and is 68 degrees in this embodiment. The light-emitting end face 21a is formed by cutting a glass plate of a rectangular parallelepiped shape.

An angle formed by the light-emitting end face 22a of the second glass plate 22 and the surface 22c on the opposite side of the surface 22b opposed to the second electrode 12 is 68 degrees, which is the same as the angle of the light-emitting end face 21a of the first glass plate 21.

Since both the light-emitting end faces 21a and 22a are tilted, the light-emitting end face 22a and a light-emitting end face not tilted are compared. As shown in FIG. 6, an emission angle θ1 on the light-emitting end face 22a in this embodiment is larger than an emission angle θ2 at the time when an angle formed by the light-emitting surface 22a and the surface 22c of the second glass plate 22 is a right angle (indicated by a broken line shown in FIG. 6). In other words, a deflection angle of light emitted from the light-emitting end face 22a is larger when the light-emitting end face 22a is tilted as in this embodiment.

In the electro-optical element 30 according to this embodiment, it is possible to obtain effects same as the effects of the electro-optical element 20 according to the second embodiment. Moreover, in the electro-optical element 30 according to this embodiments it is possible to further increase a deflection angle (a scanning angle) of light emitted from the light-emitting end face 22a by tilting the light-emitting end face 22a with respect to the surface 22c.

The light-emitting end face 11a of the first electrode 11 and the light-emitting end face 12a of the second electrode 12 in the first embodiment may be tilted in the same manner as the first and second glass plates 21 and 22.

Moreover, the tilt is not limited to a straight surface and may be a curved surface.

Fourth Embodiment

A fourth embodiment of the invention will be explained with reference to FIG. 7.

In this embodiment, an image display apparatus (a scanning image display apparatus) 40 including the electro-optical element 1 according to the first embodiment as scanning means will be explained.

Figure 7:
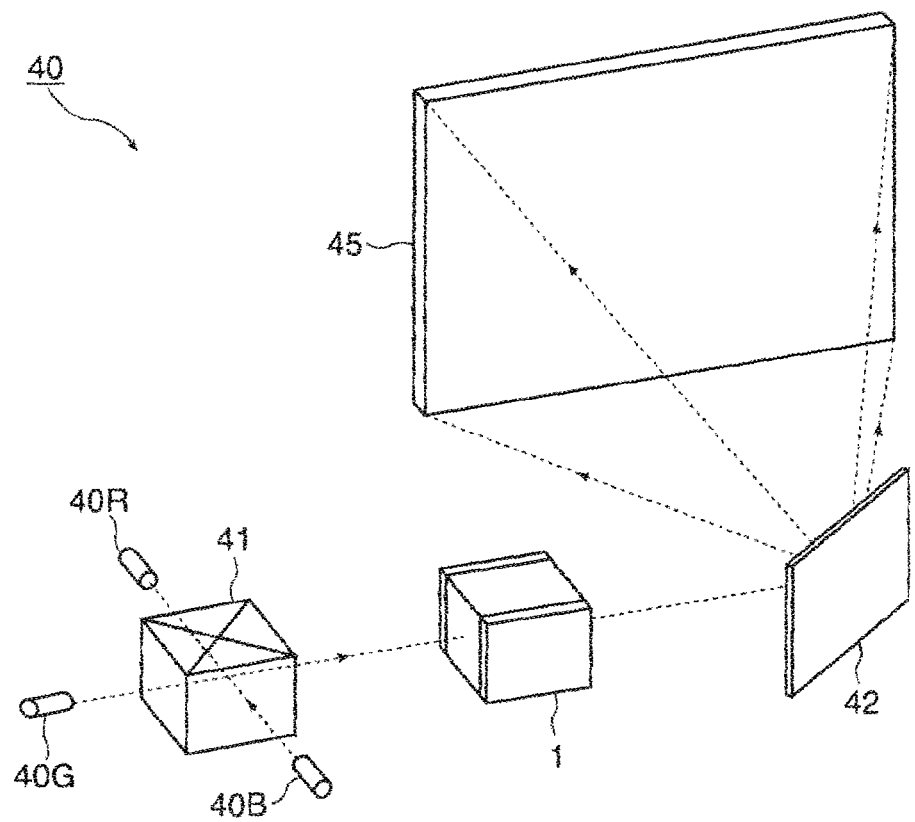
FIG. 7 is a perspective view showing a scanning optical apparatus according to a fourth embodiment of the invention.
Figure 8A:
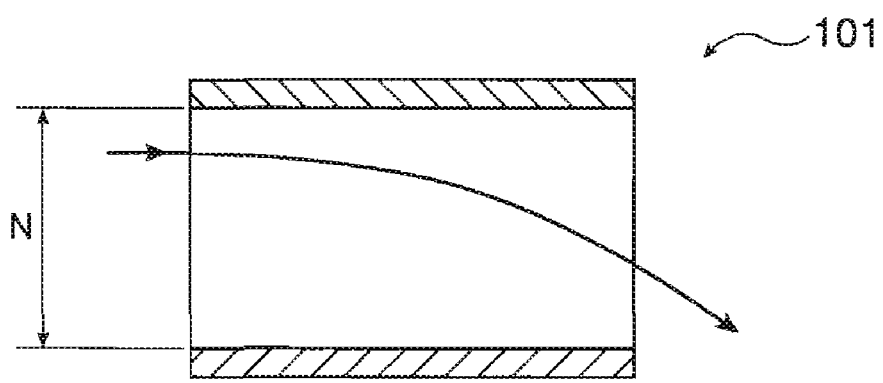
FIGS. 8A and 8B are main part sectional views showing an electro-optical element used in a scanning optical apparatus in the past.
Figure 8B:
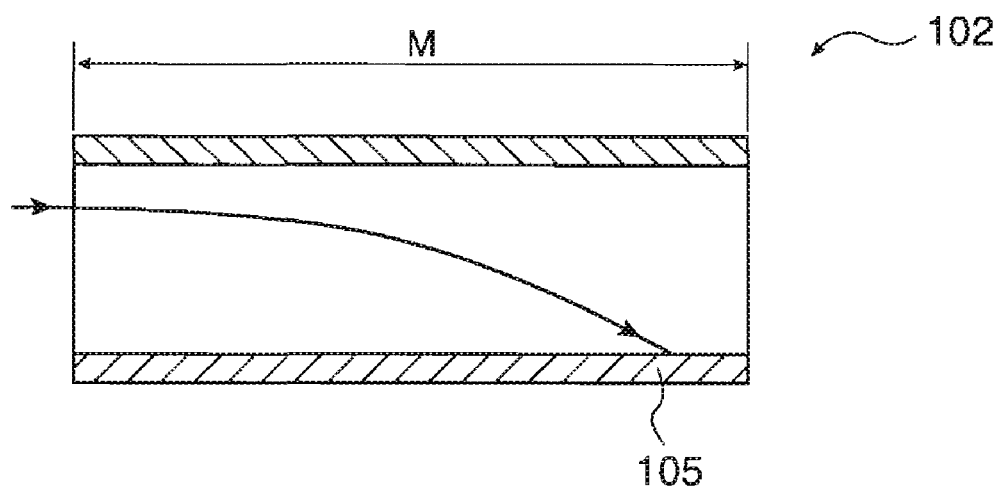

The image display apparatus 40 according to this embodiment includes, as shown, in FIG. 7, a red light source device (a light source device) 40R that emits a red laser beam, a green light source device (a light source device) 40G that emits a green laser beam, a blue light source device (a light source device) 40B that emits a blue laser beam, a cross dichroic prism 41, the electro-optical element 1 that scans a laser beam emitted from the cross dichroic prism 41 in a horizontal direction of a screen 45, a galvanometer mirror 42 that scans the laser beam emitted from the electro-optical element 1 in a vertical direction of the screen 45, and the screen (a projection surface) 45 on which the scanned laser beam is projected from the galvanometer mirror 42.

A method of projecting an image on the screen 45 using the image display apparatus 40 according to this embodiment having the structure described above will be explained.

Laser beams emitted from the light source devices 40R, 40G, and 40B are combined by the cross dichroic prism 41 and the combined light beam is made incident on the electro-optical element 1. The laser beam made incident on the electro-optical element 1 is scanned in the horizontal direction of the screen 45, scanned in the vertical direction by the galvanometer mirror 42, and projected on the screen 45.

In the image display apparatus 40 according to this embodiment, since the electro-optical element 1 having a large deflection angle is used as scanning means, it is possible to cope with a resolution such as 4 k of the DCI (Digital Cinema Initiatives) specifications. Therefore, it is possible to clearly display an image on the screen 45 without causing deterioration in an image quality.

Moreover, the scanning means constituted by the electro-optical element 1 can perform scanning faster than the MEMS scanner. Thus, as in this embodiment, by using an electro-optical scanner on the horizontal scanning side on which high-speed scanning is required and using the galvanometer mirror (movable scanning means for reflecting light by moving) 42 with a high degree of scanning freedom on the vertical scanning side, it is possible to expect that a high-performance image display apparatus is realized. Scanning may be performed by an inexpensive polygon mirror, which is one of the movable scanning means, instead of the galvanometer mirror 42. In other words, since accuracy of scanning of the electro-optical element 1 is high, the image display apparatus can perform high-performance image display while holding down cost even if a mirror as precise as the galvanometer mirror is not used.

In the above explanation of the image display apparatus 40 according to this embodiment, the electro-optical element 1 according to the first embodiment is used. However, it is also possible to use the electro-optical elements according to the second and third embodiments (including the modification).

The image display apparatus is explained as the scanning optical apparatus in which the electro-optical element is used. However, it is also possible to apply the electro-optical elements according to the first to third embodiments to a laser printer (a scanning optical apparatus).

The technical scope of the invention is not limited to the embodiments described above. It is possible to apply various modifications to the embodiments without departing from the spirit of the invention.

For example, in the embodiments, the KTN crystal is explained as an example of the optical element. However, the optical element is not limited to this. The optical element may be any element as long as a refractive index of the element changes linearly. For example, the optical element may be a dielectric crystal having the electro-optical effect such as $LiNbO_3$ (niobic lithium). However, since a crystal having a composition such as $LiNbO_3$ has a small scanning deflection angle compared with the KTN crystal and a driving voltage for the crystal is high. Thus, it is preferable to use the KTN crystal.

The entire disclosure of Japanese Patent Application No. 2006-246780, filed Sep. 12, 2006 is expressly incorporated by reference herein.

What is claimed is:

1. An electro-optical element comprising:
    an optical element that scans a laser beam made incident on the optical element when a refractive index distribution changes according to an electric field generated inside the electro-optical element;
    a first electrode and a second electrode arranged on two surfaces of the optical element opposed to each other, wherein
        at least one of the first electrode and the second electrode is a transparent electrode; and
    an optical member having light transmission properties arranged on the transparent electrode, the optical member comprising
        a first glass plate disposed on the first electrode, and
        a second glass plate disposed on the second electrode.

2. The electro-optical element of claim 1, wherein a light-emitting end face of the transparent electrode is tilted with respect to a light-emitting end face of the optical element.

3. The electro-optical element of claim 1, wherein a refractive index of the optical member is higher than a refractive index of the transparent electrode.

4. The electro-optical element of claim 1, wherein a light-emitting end face of the optical member is tilted with respect to a light-emitting end face of the optical element.

5. The electro-optical element of claim 1, wherein a light-shielding member is provided on a light-emitting end face side of the optical element.

6. The electro-optical element of claim 1, wherein the optical element has a composition of $KT_{a1-x}Nb_xO_3$.

7. A scanning optical apparatus comprising:
    a light source device that emits light; and
    a scanning unit that scans the light emitted from the light source device to a projection surface, wherein
        the scanning unit comprises the electro-optical element of claim 1.

8. The scanning optical apparatus of claim 7, wherein the electro-optical element performs horizontal scanning.

9. The electro-optical element of claim 1, wherein a direction of the electric field is perpendicular to an optical axis of the laser beam.

10. An electro-optical element comprising:
    an optical element that scans a laser beam made incident on the optical element when a refractive index distribution changes according to an electric field generated inside the electro-optical element, wherein
        a direction of the electric field is perpendicular to an optical axis of the laser beam;
    a first electrode and a second electrode arranged on two surfaces of the optical element opposed to each other, wherein
        at least one of the first electrode and the second electrode is a transparent electrode.

11. The electro-optical element of claim 10, further comprising an optical member having light transmission properties arranged on the transparent electrode.

12. The electro-optical element of claim 11, wherein the optical member further comprises a first glass plate disposed on the first electrode, and a second glass plate disposed on the second electrode.

* * * * *